United States Patent
Tanaka et al.

(10) Patent No.: US 9,448,751 B2
(45) Date of Patent: Sep. 20, 2016

(54) PRINT CONTROL DEVICE, IMAGE FORMING APPARATUS, AND NON-TRANSITORY COMPUTER READABLE MEDIUM

(71) Applicant: FUJI XEROX CO., LTD., Tokyo (JP)

(72) Inventors: Kazunari Tanaka, Kanagawa (JP); Miho Ishizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/048,587

(22) Filed: Oct. 8, 2013

(65) Prior Publication Data

US 2014/0146353 A1 May 29, 2014

Related U.S. Application Data

(63) Continuation of application No. 13/952,016, filed on Jul. 26, 2013.

(30) Foreign Application Priority Data

Nov. 29, 2012 (JP) ................... 2012-261740

(51) Int. Cl.
*G06F 3/12* (2006.01)
*G06T 1/00* (2006.01)

(52) U.S. Cl.
CPC .......... *G06F 3/1242* (2013.01); *G06F 3/125* (2013.01); *G06F 3/1241* (2013.01); *G06F 3/1262* (2013.01); *G06F 3/1288* (2013.01); *G06F 3/1296* (2013.01); *G06T 1/0021* (2013.01); *G06T 2201/005* (2013.01)

(58) Field of Classification Search
None
See application file for complete search history.

(56) References Cited

U.S. PATENT DOCUMENTS

| | | |
|---|---|---|
| 2004/0085583 A1 | 5/2004 | Yamamura |
| 2006/0055952 A1* | 3/2006 | Ferlitsch ............ 358/1.13 |
| 2007/0023522 A1 | 2/2007 | Hasuike |

(Continued)

FOREIGN PATENT DOCUMENTS

| | | |
|---|---|---|
| CN | 102402402 A | 4/2012 |
| JP | 11-070717 A | 3/1999 |
| JP | 11-353143 A | 12/1999 |
| JP | 2004-168035 A | 6/2004 |

(Continued)

OTHER PUBLICATIONS

Communication dated May 11, 2016, from the State Intellectual Property Office of People's Republic of China in counterpart application No. 201310404352.9.

*Primary Examiner* — Nicolas Pachol
*Assistant Examiner* — Lennin Rodriguezgonzale
(74) *Attorney, Agent, or Firm* — Sughrue Mion, PLLC

(57) ABSTRACT

A print control device includes an output unit, an adding unit, and a transmitting unit. The output unit outputs generated print data to a printing mechanism. The generated print data is generated as a result of unit print data, which includes page data of at least one page, being copied; and includes pieces of the unit print data. The adding unit adds blank page data between one piece of unit print data and another piece of unit print data to be printed next in line to the one piece of unit print data. The transmitting unit transmits, to the printing mechanism, information for causing an additional image to be formed on a medium when an image based on the page data is printed on the medium, and information for causing the additional image not to be formed on a blank page formed based on the added blank page data.

16 Claims, 22 Drawing Sheets

(56) References Cited

U.S. PATENT DOCUMENTS

2007/0291318 A1   12/2007  Wang et al.
2011/0169861 A1*  7/2011  Suzuki .................. G06T 7/0046
                                              345/632

FOREIGN PATENT DOCUMENTS

| JP | 2007-036755 A | 2/2007 |
| JP | 2007-226414 A | 6/2007 |
| JP | 2008-176651 A | 7/2008 |

* cited by examiner

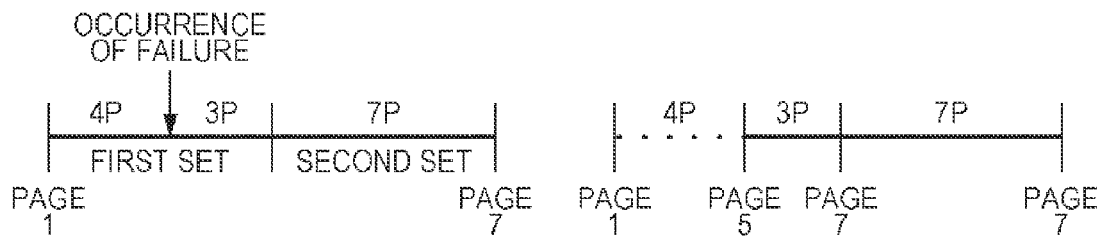

FIG. 21A

[INFORMATION TABLE] ··· AT START OF PRINTING

START PAGE : 1
END PAGE : 7
NUMBER OF PAGES PER SET : 7
NUMBER OF SETS : 2

FIG. 21B

[INFORMATION TABLE] ··· AT RESTART OF PRINTING
AFTER OCCURRENCE OF FAILURE

START PAGE : 5
END PAGE : 7
NUMBER OF PAGES PER SET : 7
NUMBER OF PRINTED PAGES AT OCCURRENCE OF FAILURE : 4
NUMBER OF SETS : 2
NUMBER OF OUTPUT SETS : 0
NUMBER OF OUTPUT PAGES : 0+4 ◀---- ADD

HOLD NUMBER OF PAGES PRINTED BEFORE FAILURE HAS OCCURRED

FIG. 22

| MONITOR | | | |
|---|---|---|---|
| JOB NAME | OUTPUT/ TOTAL NUMBER OF SETS | OUTPUT/ TOTAL NUMBER OF PAGES | JOB STATE |
| JOB A | 0/2 | 4/7 | NOW PRINTING |

↑

| MONITOR | | | |
|---|---|---|---|
| JOB NAME | OUTPUT/ TOTAL NUMBER OF SETS | OUTPUT/ TOTAL NUMBER OF PAGES | JOB STATE |
| JOB A | 2/2 | 7/7 | PRINT COMPLETED |

INFORMATION DISPLAYED AFTER RECOVERY FROM FAILURE

PRINT CONTROL DEVICE, IMAGE FORMING APPARATUS, AND NON-TRANSITORY COMPUTER READABLE MEDIUM

CROSS-REFERENCE TO RELATED APPLICATIONS

This application is a Continuation Application of U.S. application Ser. No. 13/952,016 filed Jul. 26, 2013, which is based on and claims priority under 35 USC 119 from Japanese Patent Application No. 2012-261740 filed Nov. 29, 2012, the disclosures of which are incorporated herein by reference in their entirety.

BACKGROUND

Technical Field

The present invention relates to a print control device, an image forming apparatus, and a non-transitory computer readable medium.

SUMMARY

According to an aspect of the invention, there is provided a print control device including an output unit, an adding unit, and a transmitting unit. The output unit outputs generated print data to a printing mechanism. The generated print data is generated as a result of unit print data being copied. The unit print data includes page data of at least one page. The generated print data includes plural pieces of the unit print data and is treated as a single piece of unit print data. The adding unit adds blank page data between one piece of unit print data among the plural pieces of unit print data included in the generated print data and another piece of unit print data to be printed by the printing mechanism next in line to the one piece of unit print data. The transmitting unit transmits, to the printing mechanism, information for causing an additional image to be formed on a medium when an image based on the page data included in the unit print data is printed on the medium by the printing mechanism, and transmits, to the printing mechanism, information for causing the additional image not to be formed on a blank page which is formed in accordance with the added blank page data.

BRIEF DESCRIPTION OF THE DRAWINGS

An exemplary embodiment of the present invention will be described in detail based on the following figures, wherein:

FIG. 18 illustrates an example of information displayed on a monitor;

FIGS. 19A and 19B illustrate a printing state of an image forming apparatus;

FIG. 20 illustrates an example of information displayed on the monitor;

FIGS. 21A and 21B illustrate information, such as the number of printed pages;

FIG. 22 illustrates an example of information displayed on the monitor;

DETAILED DESCRIPTION

An exemplary embodiment of the present invention will be described in detail below with reference to the attached drawings.

Figure 1:
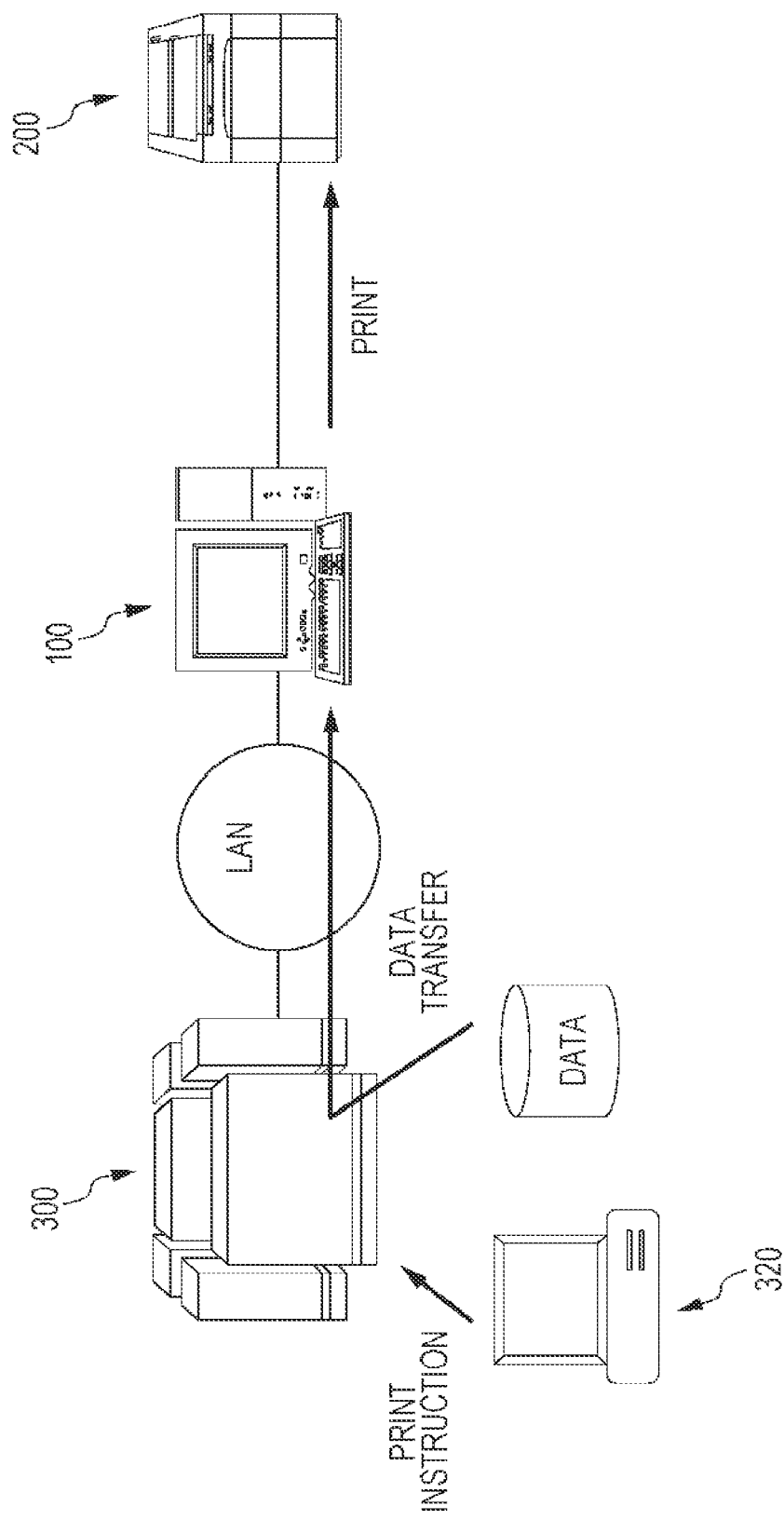
FIG. 1 illustrates an example of the configuration of an image forming system to which an exemplary embodiment is applied.

FIG. 1 illustrates an example of the configuration of an image forming system to which the present exemplary embodiment is applied.

The image forming system illustrated in FIG. 1 includes a print server 100 and an image forming apparatus 200, which are connected to each other directly or via a network or the like. The print server 100 manages a print job which represents processing based on a print instruction (output instruction). The image forming apparatus 200 performs a printing process (image forming process) under control of the print server 100. The print server 100 is also connected to a host server 300 via a local area network (LAN).

The print server 100, which is an example of a print control device, is implemented by, for example, a personal computer having a network function. The print server 100 receives a print instruction and print data (output data) from the host server 300, and accumulates (spools) the print data. The print server 100 then transmits the accumulated print data to the image forming apparatus 200 to cause the image forming apparatus 200 to perform a printing process. In the present exemplary embodiment, the print server 100 is provided separately from the image forming apparatus 200 and the image forming apparatus 200 is controlled by another device separated from the image forming apparatus 200. However, the image forming apparatus 200 may include each functional unit (that is, each functional unit that performs a corresponding process described below) of the print server 100.

The image forming apparatus 200, which is an example of a printing mechanism or an image forming mechanism, acquires print data from the print server 100, and forms (prints) an image in accordance with the acquired print data on a recoding medium, such as paper, by using image forming agents so as to output the image. The present exemplary embodiment does not particularly specify a mechanism for forming an image on a recoding medium, and various existing systems, such as so-called electrophotographic and inkjet systems, may be used.

The host server 300 is implemented by, for example, a personal computer having a network function, and includes a storage device that holds print data therein. In response to a print instruction, the host server 300 reads out a print target (print data) specified by this print instruction from the storage device and transmits the print target to the print server 100. The print instruction is input from, for example, a terminal apparatus 320 connected to the host server 300. This terminal apparatus 320 is implemented by, for example, a personal computer including an input device, such as a keyboard.

Figure 2:
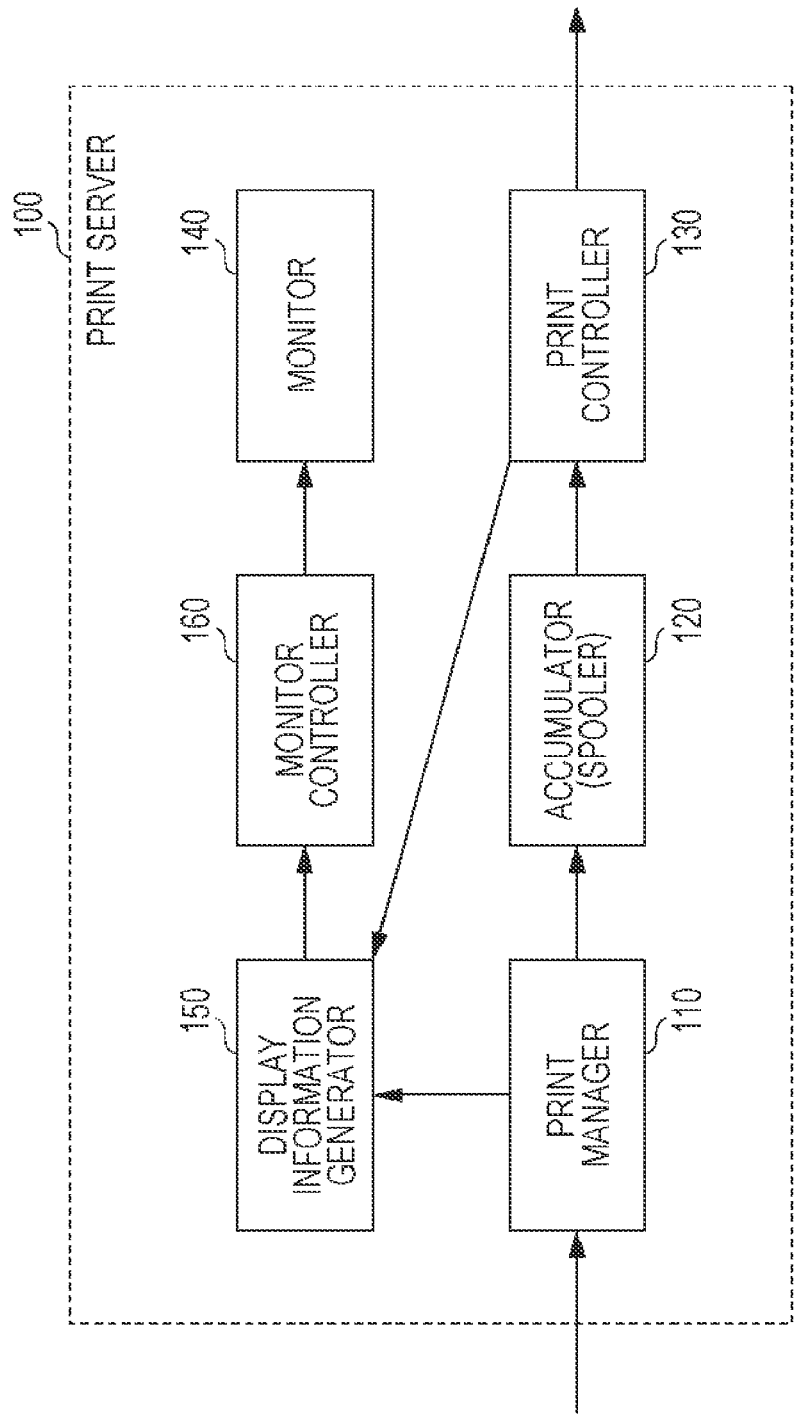
FIG. 2 illustrates an example of the functional configuration of a print server.

FIG. 2 illustrates an example of the functional configuration of the print server 100.

As illustrated in FIG. 2, the print server 100 of the present exemplary embodiment includes a print manager 110, an accumulator (spooler) 120, a print controller 130, a monitor 140, a display information generator 150, and a monitor controller 160. The print manager 110 acquires print data and processes the print data. The accumulator 120 accumulates print data therein. The print controller 130 outputs print data and the like to the image forming apparatus 200, and controls the image forming apparatus 200. The monitor 140 includes, for example, a liquid crystal display, and displays information to a user. The display information generator 150 generates information to be displayed on the monitor 140. The monitor controller 160 receives information from the display information generator 150 and causes the monitor 140 to display this information thereon.

The print manager 110 acquires a print instruction, a print setting, and print data from the host server 300; converts the acquired print data into intermediate data; and causes the accumulator 120 to accumulate the intermediate data therein. Print data received from the host server 300 is written in a page description language (PDL). Thus, the print manager 110 analyzes the received print data, and converts the received print data into intermediate data that is less dependent on the model or data processing environment. Then, the print manager 110 sends the generated intermediate data to the accumulator 120.

The accumulator 120 temporarily accumulates therein print data that has been converted into intermediate data by the print manager 110. Processing speed of the image forming apparatus 200 that physically forms an image on a recording medium is lower than data processing speed of the print server 100. In order to cope with a difference between these speeds, print data is accumulated. In the case where multiple print instructions are issued during a short period of time, multiple pieces of print data corresponding to these print instructions may be accumulated in the accumulator 120.

The print controller 130, which is an example of an output unit, is a so-called printer driver. The print controller 130 reads out print data from the accumulator 120, and outputs the print data to the image forming apparatus 200. In the case where multiple pieces of print data are accumulated in the accumulator 120 as described above, the print controller 130 reads out one piece of accumulated print data every time a printing process is finished in the image forming apparatus 200, and transmits the print data to the image forming apparatus 200.

The display information generator 150 receives information related to printing from the print manager 110. Specifically, the display information generator 150 receives, for example, the printing start page number, the printing end page number, the number of sets to be printed, the N-up information (the number of page images collectively printed on one page), and on/off of double-sided printing. The display information generator 150 also receives information about a printing progress state from the print controller 130. In accordance with these pieces of information received from the print manager 110 and the print controller 130, the display information generator 150 generates information to be displayed on the monitor 140. The display information generator 150 then outputs this information to the monitor controller 160.

In the case where multiple pieces of print data are accumulated, the accumulator 120 of some kind used in existing image forming systems does not guarantee an order in which the pieces of print data are read out by the print controller 130 due to its specifications. That is, an order in which pieces of print data are accumulated in the accumulator 120 possibly differs from an order in which the pieces of print data are read out. In such systems, for example, when print instructions are issued in an order of print jobs A, B, and C (an order of unit print data A, unit print data B, and unit print data C), the order in which the pieces of print data are read out from the accumulator 120 is possibly changed and print jobs are possibly executed in the image forming apparatus 200 in an order of print jobs A, C, B or the like.

When multiple pieces of print jobs are executed, it is sometimes required that printed results be output in an order in which corresponding print instructions are issued. However, the order in which printed results are output by the image forming systems including the accumulator 120 based on the above-described specifications does not necessarily match the order in which print instructions are issued. Thus, the order of the output printed results needs to be checked manually, for example. In contrast, in the present exemplary embodiment, a process of integrating multiple print jobs into one print job is executed as described below. This makes changing of the order of pieces of print data occur less likely when the pieces of print data are read from the accumulator 120.

Figure 3:
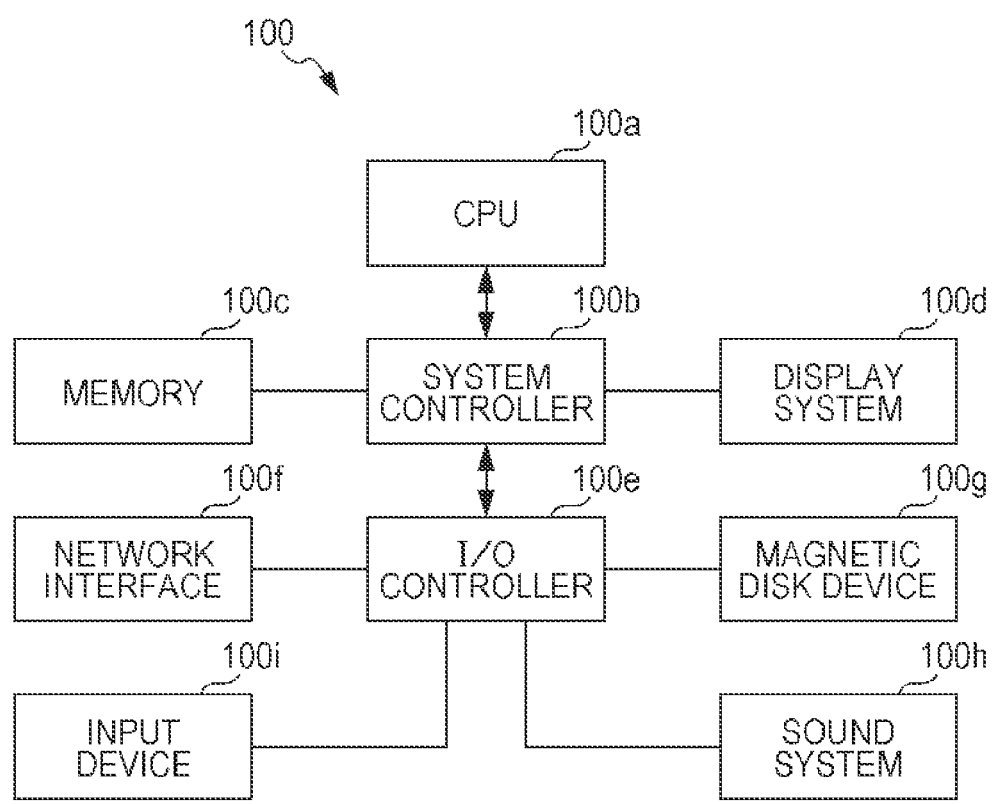
FIG. 3 illustrates an example of the hardware configuration of the print server.
Figure 4:
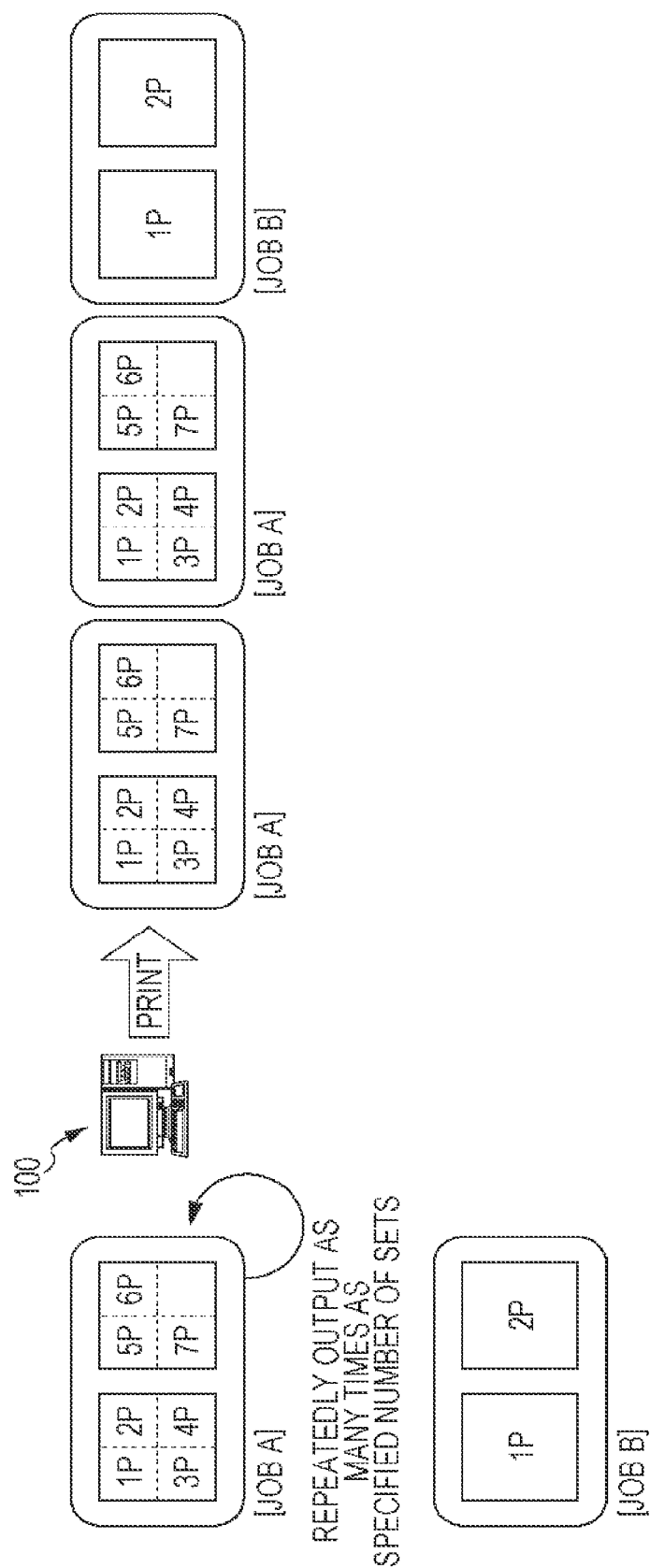
FIGS. 4A and 4B describe an example of a process performed by the print server.

FIG. 3 illustrates an example of the hardware configuration of the print server 100.

The print server 100 illustrated in FIG. 3 includes a central processing unit (CPU) 100a that is a computation unit, and a memory 100c that is a main memory. The print server 100 also includes external devices, such as a magnetic disk device (such as a hard disk drive) 100g, a network interface 100f, a display system 100d that includes the monitor 140, a sound system 100h, and an input device 100i, such as a keyboard and a mouse.

In the configuration example illustrated in FIG. 3, the memory 100c and the display system 100d are connected to the CPU 100a via a system controller 100b. Also, the network interface 100f, the magnetic disk device 100g, the sound system 100h, and the input device 100i are connected to the system controller 100b via an input/output (I/O) controller 100e. The individual components are connected to each other via various kinds of bus, such as a system bus and an I/O bus.

FIG. 3 merely illustrates the preferable hardware configuration of the print server 100 in terms of application of the present exemplary embodiment. The present exemplary embodiment is applicable widely to information processing systems that perform computation to execute simulation and is not realized only in the illustrated configuration.

In the print server 100 illustrated in FIG. 3, the magnetic disk device 100g stores a program for implementing the functions of the print server 100. This program is loaded into the memory 100c and the CPU 100a executes processes based on this program, whereby the various functions are implemented.

Specifically, processes performed by the print manager 110 and the display information generator 150 are performed by the CPU 100a in accordance with, for example, a program prepared as an application program or the like. Also, a print instruction and print data are received from the host server 300 via, for example, the network interface 100f. Furthermore, during conversion of print data, the memory 100c is used as a working memory.

The accumulator 120 is implemented by using a memory unit, such as the memory 100c or the magnetic disk device 100g, as a print data holding unit under control of the CPU 100a that executes a program module prepared as one of functions of the operating system (OS), for example. Processes performed by the print controller 130 and the monitor controller 160 are performed by the CPU 100a in accordance with program modules prepared as some of functions of the OS, for example.

FIGS. 4A and 4B and FIGS. 5A and 5B each describe an example of a process performed by the print server 100.

It is assumed here that multiple sets of printed materials are created. In such a case, for example, print data represented by a job A in FIG. 4A (unit print data represented by the job A) is copied and the resulting pieces of print data (pieces of unit print data) are sequentially output to the accumulator 120 from the print manager 110. The accumulator 120 accumulates as many pieces of print data as the number of sets to be printed. The accumulator 120 also accumulates another piece of print data, for example, print data represented by a job B illustrated in FIG. 4A.

In this case, as described above, the order of pieces of print data is possibly changed because of the specifications when the pieces of print data are read out from the accumulator 120. That is, an order in which pieces of print data are accumulated in the accumulator 120 possibly differs from an order in which the pieces of print data are read out from the accumulator 120. More specifically, for example, even though print instructions are issued in an order of print jobs A and B, the order is possibly changed when pieces of print data are read out from the accumulator 120, and consequently printing is performed in the image forming apparatus 200 in an order of the first set based on the print job A, a set based on the print job B, and the second set based on the print job A, for example.

Figure 5:
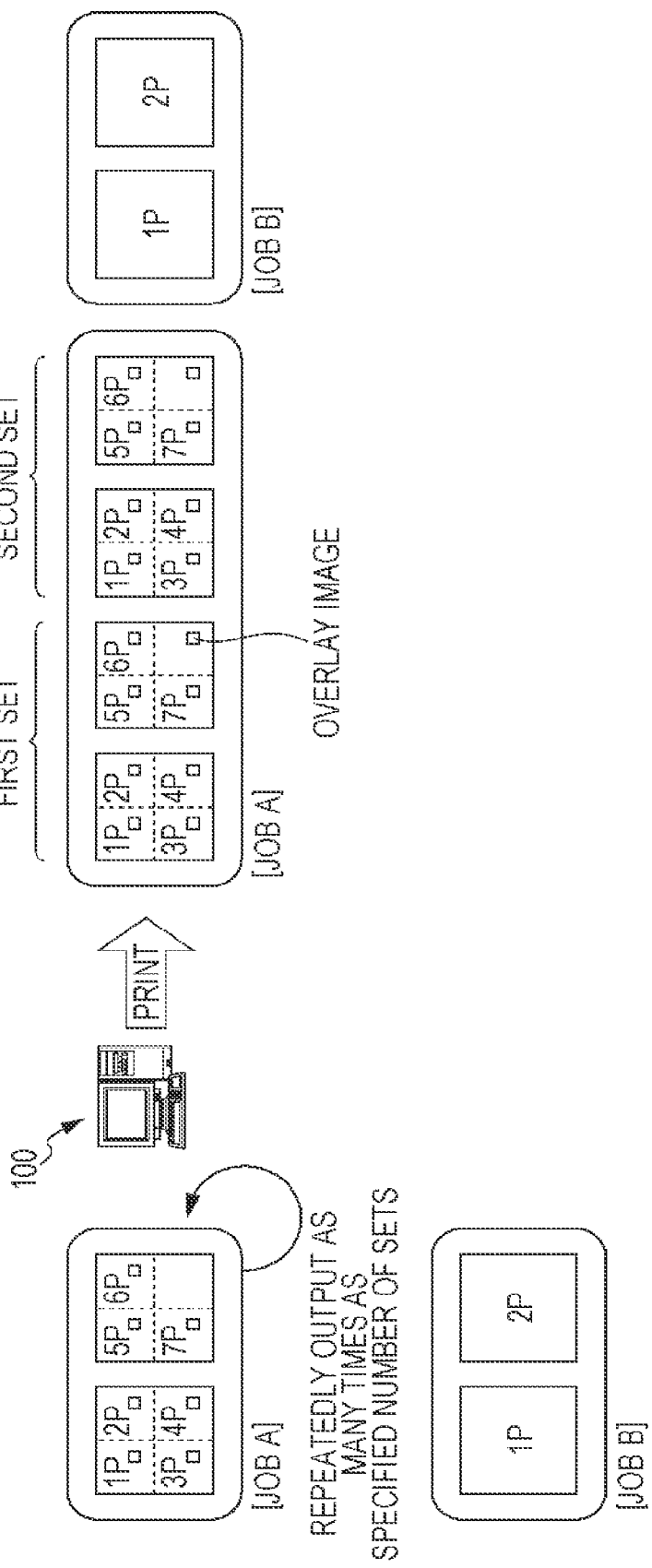
FIGS. 5A and 5B describe an example of a process performed by the print server.

Such a change of the order is avoided by integrating the print jobs A for multiple sets into one print job as illustrated in FIG. 5B. More specifically, upon acquiring print data, the print manager 110 outputs this print data to the accumulator 120 multiple times. At this time, pieces of print data for multiple sets are collectively output to the accumulator 120 as one piece of print data in the present exemplary embodiment, as illustrated in FIG. 5B. Specifically, the print manager 110 integrates pieces of print data for multiple sets into one piece of print data, and outputs this generated piece of print data (generated print data) to the accumulator 120. This consequently makes outputting of print data of the print job B to the image forming apparatus 200 occur less likely while the pieces of print data of the print job A for multiple sets are being output from the accumulator 120 to the image forming apparatus 200.

During printing, images for N pages (multiple pages) are sometimes collectively printed within one page or double-sided printing is sometimes performed. In the case where pieces of print data for multiple sets are integrated into one as described above when such settings are made, a preceding "set" possibly contains a blank area and an image of the first page of a following "set" is possibly formed in this blank area.

Figure 6:
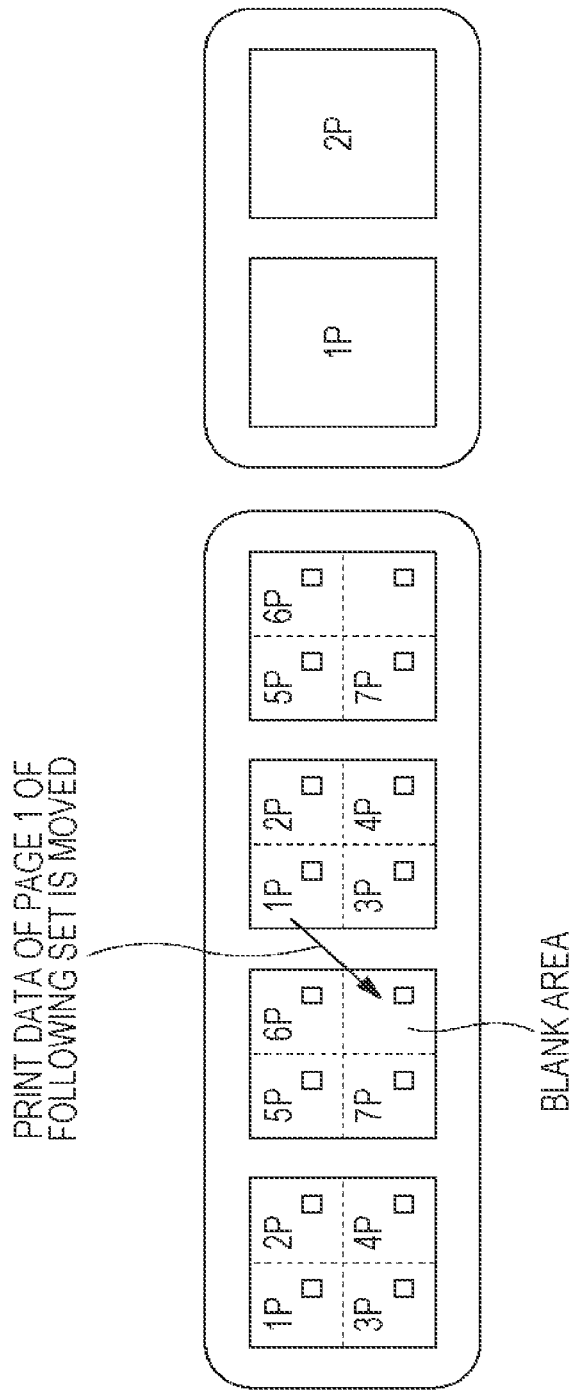
FIG. 6 illustrates how pages are printed when N page images are collectively printed within one page.

More specifically, in the case where N page images are collectively printed within one page and the number of pages actually constituting print data is not an integral multiple of N, a blank area without print data is formed at the last page as illustrated in FIG. 6 (which illustrates how pages are printed when N page images are collectively printed within one page). In the case of double-sided printing, a blank area is formed at the last page when the total number of pages is an odd number. In such cases, when pieces of print data for multiple sets are integrated into one as described above, an image based on print data located at the start of a following "set" is formed in this blank area.

Such an inconvenience is avoided by, for example, inserting (adding) a blank page (blank page data) at the blank area. This, however, causes a new inconvenience. Specifically, when a blank page is inserted, it is considered that image data exists at part where the blank page is inserted. As a result, an overlay image (additional image additionally printed on each page, such as a background image or header) is formed at the part where the blank page is inserted.

A specific description is given referring to FIG. 5B. In FIG. 5B, an overlay image (represented by a square mark in FIG. 5B) is formed on each page. In FIG. 5B, a blank page is inserted at the last page of the first set. The overlay image is also formed on this blank page because it is considered that print data also exists for this blank page.

Figure 7:
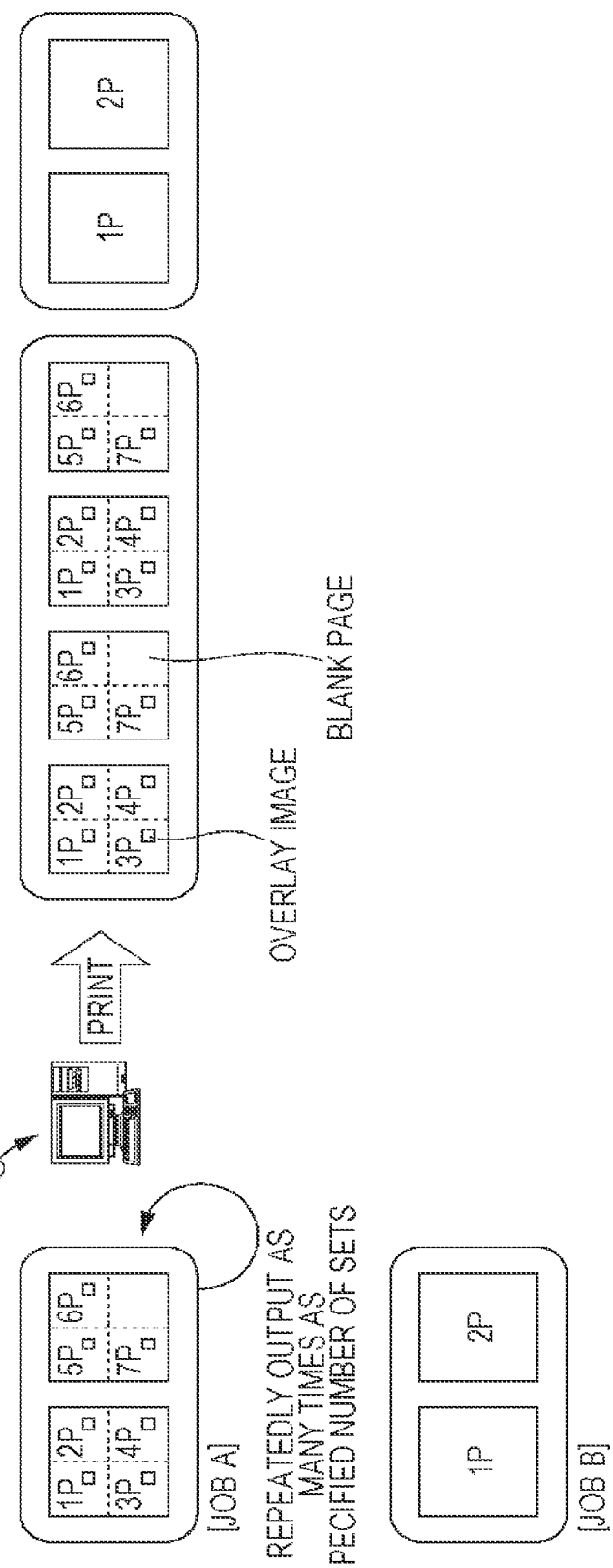
FIGS. 7A and 7B illustrate how pages are printed when printing of an overlay image is suppressed.

In the present exemplary embodiment, a following process is performed so as to suppress formation of an overlay image on a blank page. When formation of an overlay image on a blank page is suppressed, the overlay image is not formed on a blank page located at the last page of each "set" as illustrated in FIG. 7B (which illustrates how pages are printed when formation of an overlay image is suppressed), while the overlay image is additionally formed on pages on which images are formed.

FIGS. 8 to 11 are flowcharts illustrating processes performed by the print manager 110.

Figure 8:
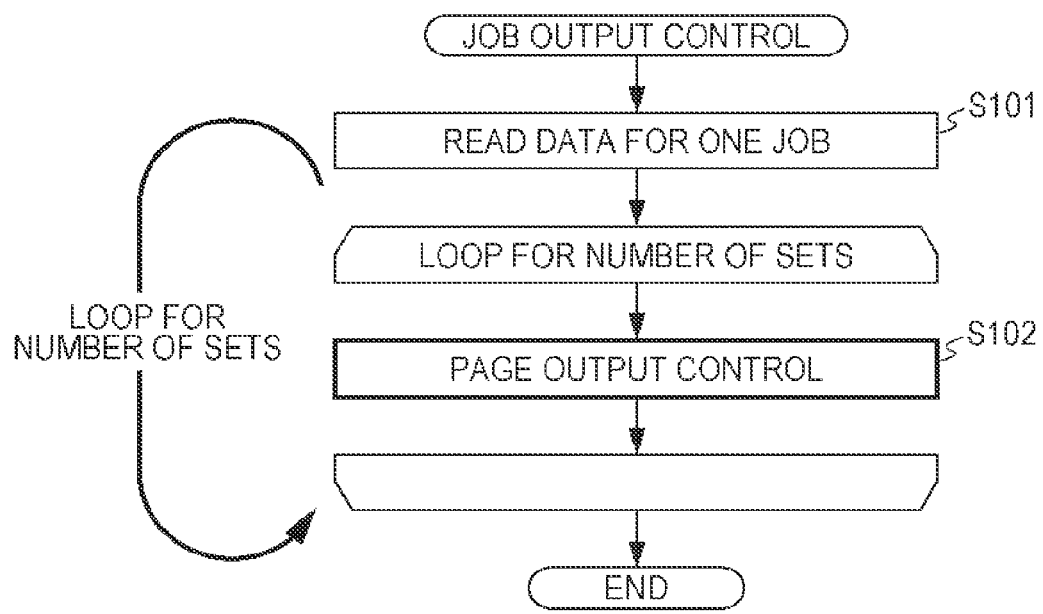
FIG. 8 is a flowchart illustrating a process performed by a print manager.

As illustrated in FIG. 8, the print manager 110 first acquires print data for one job that is transmitted from the host server 300 (step S101). Thereafter, the print manager 110 sequentially outputs pieces of print data of individual pages contained in the print data to the accumulator 120. The print manager 110 performs this output as many times as the number of sets specified by the user (step S102).

Figure 9:
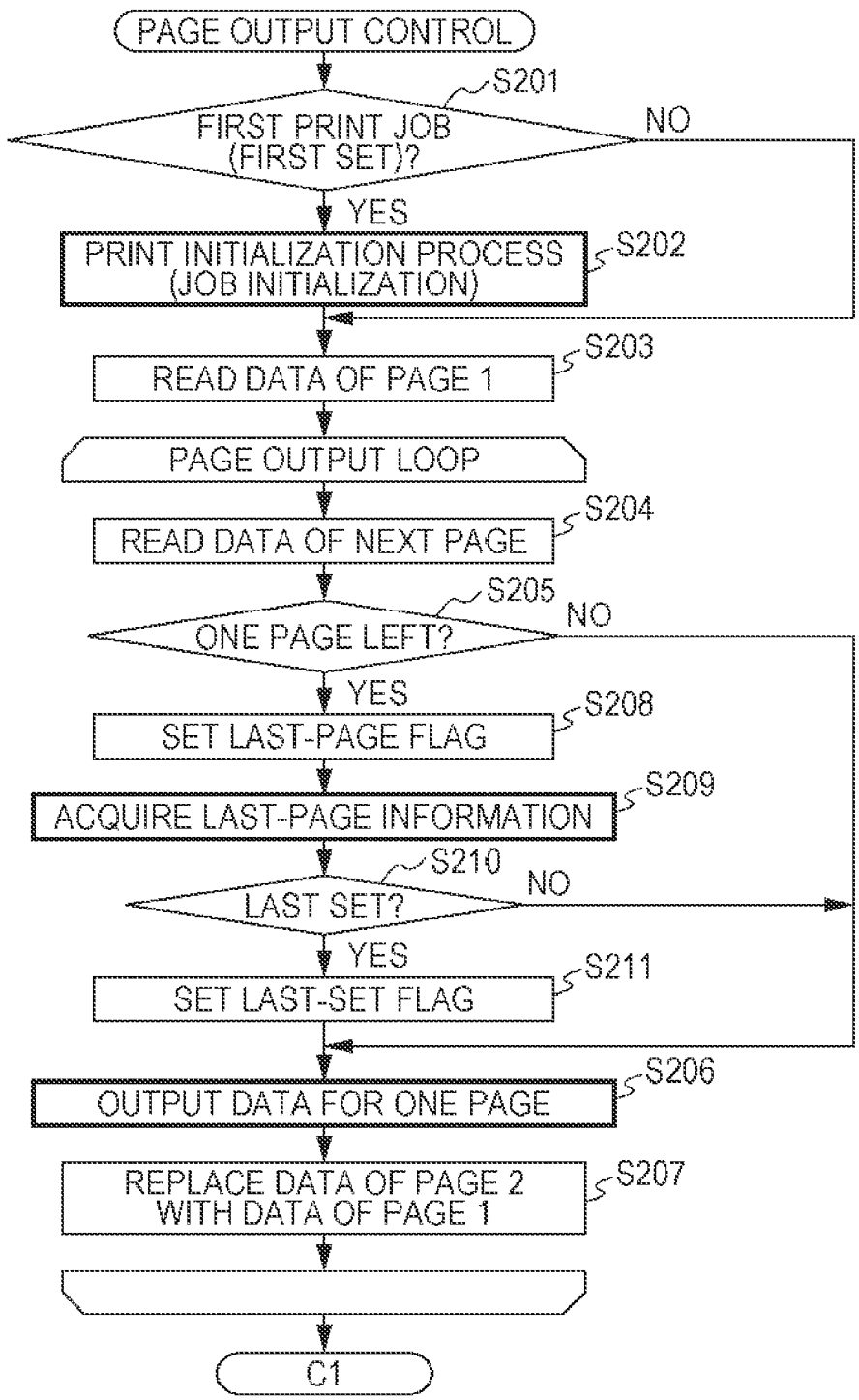
FIG. 9 is a flowchart illustrating a process performed by the print manager.

Referring now to FIG. 9, a process of step S102 will be described in detail.

In the process of step S102, the print manager 110 determines whether or not a current job being processed is a print job for the first "set" (first print job) (step S201). If it is determined that the current job is a print job for the first set, the print manager 110 performs a print initialization process (job initialization process) (step S202). If it is determined that the current job is not a print job for the first set, the print manager 110 skips this print initialization process.

Then, the print manager 110 reads data of page 1 (step S203) and data of page 2 (step S204). Thereafter, the print manager 110 determines whether or not the number of remaining pages to be processed is one (whether or not the current page is the last page) (step S205). If it is determined that the current page is not the last page, the print manager 110 outputs print data of subject page to the accumulator 120 (step S206). Thereafter, the print manager 110 replaces the data read in step S204 with the data of page 1 (step S207), and performs processing starting from step S204 again.

If it is determined in step S205 that one page is left (the current page is the last page), the print manager 110 sets a last-page flag which indicates that the current page is the last page (step S208). Subsequently, the print manager 110 acquires last-page information which is information about the last page (step S209). Then, the print manager 110 determines whether or not the current "set" being processed is the final "set" (last set) (step S210). If the current "set" is the last set, the print manager 110 sets a last-set flag which indicates the current set is the last set (step S211).

Figure 10:
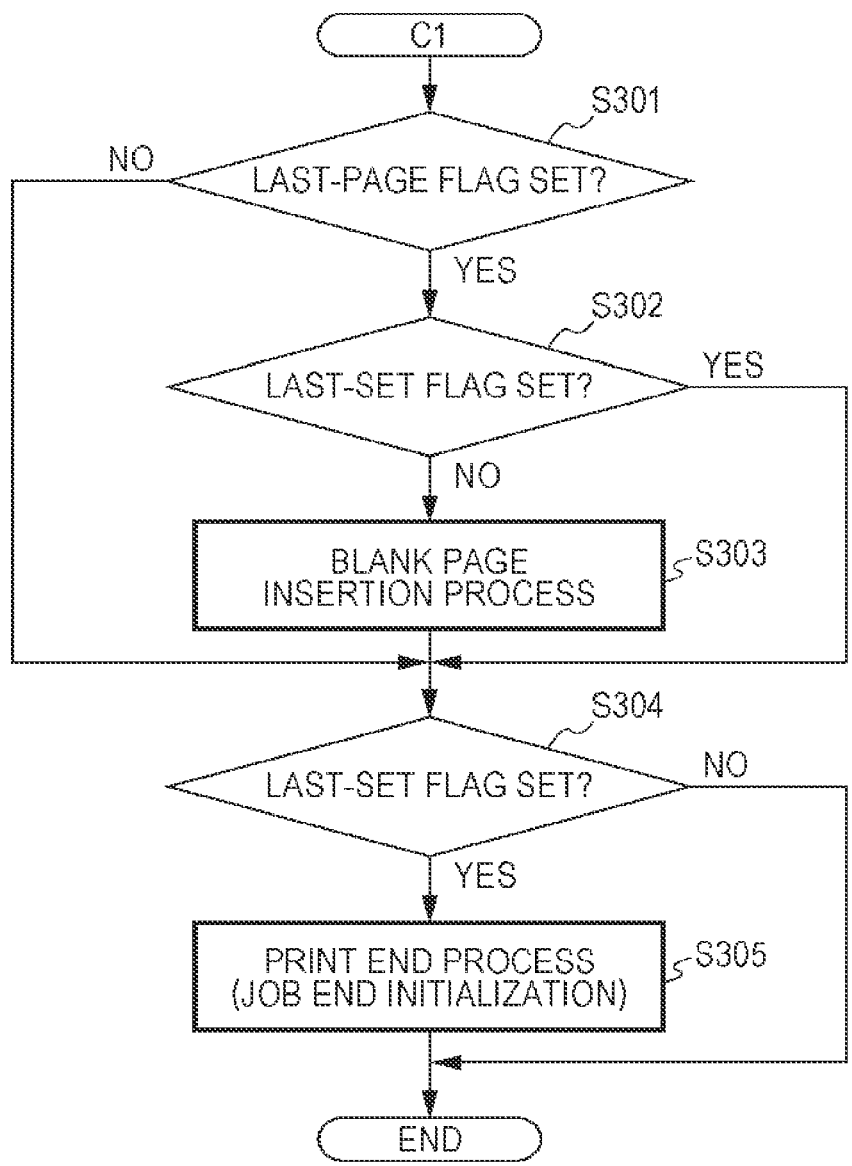
FIG. 10 is a flowchart illustrating a process performed by the print manager.

After finishing processing of steps S201 to S211 for each "set" of the multiple sets, the print manager 110 performs a process illustrated in FIG. 10. In this process, the print manager 110 first determines whether or not the last-page flag has been set (step S301). If the last-page flag has been set, the print manager 110 determines whether or not the last-set flag has been set (step S302). If the last-set flag has not been set, the print manager 110, which functions as an adding unit, performs a blank page insertion process (adding process) (step S303). When the last-page flag has been set but the last-set flag has not been set, an image of the first page of a following "set" is printed in the blank area of a preceding "set" as described above, and thus the blank page insertion process is performed.

Thereafter, the print manager 110 determines whether or not the last-set flag has been set (step S304). If the last-set flag has been set, the print manager 110 performs a print end process (job end initialization process) (step S305), and terminates the process. If it is determined in step S304 that the last-set flag has not been set, the print manager 110 performs processing starting from step S203 of FIG. 9 again.

Figure 11:
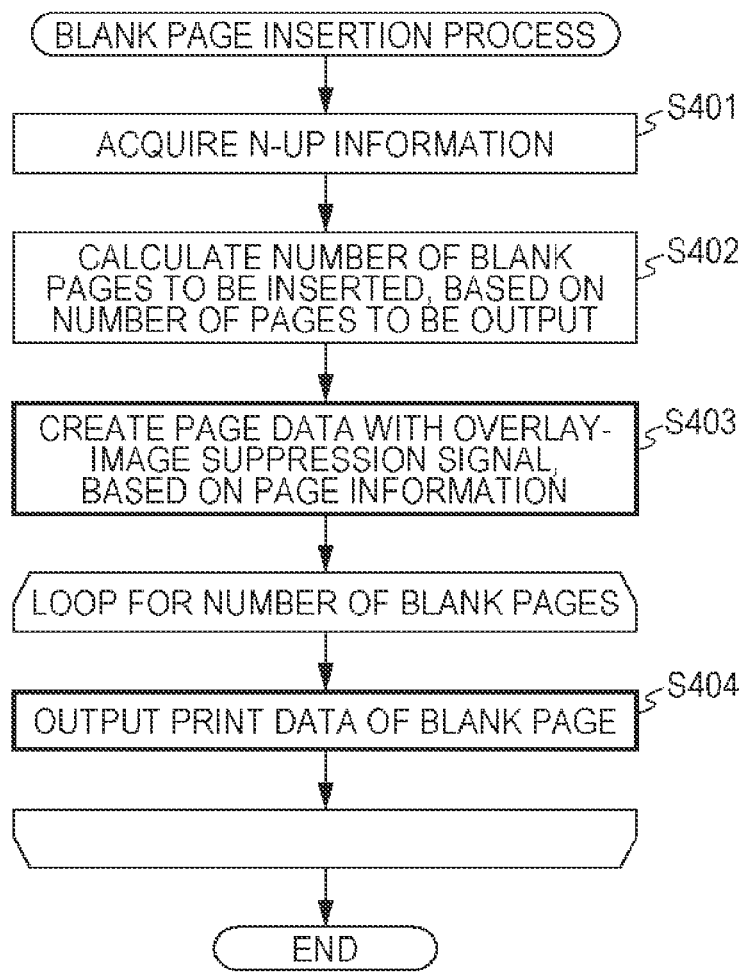
FIG. 11 is a flowchart illustrating a process performed by the print manager.

Referring next to FIG. 11, the blank page insertion process of step S303 will be described in detail.

During the blank page insertion process, the print manager 110 first acquires information about the number of page images per page (hereinafter, also referred to as N-up information) (step S401). In other words, the print manager 110 acquires information about the number of page images (the number of pages) to be collectively printed within one page. Then, in accordance with the N-up information acquired in step S401 and the number of pages per job, the print manager 110 calculates the number of blank pages to be inserted (step S402).

The number of blank pages to be inserted is calculated using, for example, Expression below.

[{(the quotient of the number of pages per job/the number of page images)+1}×the number of page images]−(the number of pages per job)

For example, suppose that the N-up information acquired in step S401 is 4 and the number of pages per job is 9. In this case, the print manager 110 determines that the number of blank pages to be inserted is 3. In the case of double-sided printing, the number of blank pages to be inserted is calculated using the above expression in which the "number of page images" is 2.

Subsequently, the print manager 110 generates print data of a blank page, which includes a signal (information) for suppressing formation of an overlay image (step S403). Then, the print manager 110 outputs the print data of a blank page generated in step S403 to the accumulator 120 as many times as the value calculated in step S402 (step S404). Consequently, blank pages are added at the blank area of a preceding "set". Specifically, blank pages are added between one job (one of individual jobs (pieces of unit print data) that are integrated into one job) and a job subjected to printing immediately after the one job.

In the present exemplary embodiment, an overlay image registration process is performed by the image forming apparatus 200 as described below. However, each blank page includes a signal for suppressing formation of an overlay image as described above. Thus, overlay images are not formed on blank pages.

Although not described above, in the present exemplary embodiment, in the case where overlay images are formed on printed materials, print data of page 1 and a name of an "overlay image" are associated with each other and are then output to the image forming apparatus 200 (via the accumulator 120). Also, print data of page 2 or each following page is output to the image forming apparatus 200 together with information indicating whether or not the "overlay image" is changed to another one. Note that the name of the overlay image to be formed on each page or the like is input to, for example, the terminal apparatus 320 by the user, and is transmitted from the terminal apparatus 320 to the print server 100.

The image forming apparatus 200 stores several "overlay images" in a storage unit (not illustrated) thereof. Upon receiving the image data of page 1 and the name of the "overlay image", the image forming apparatus 200 reads out the "overlay image" corresponding to this name from the storage unit, and registers (renders) the "overlay image" in a memory. For the "overlay image" of page 2 or each following page, the image forming apparatus 200 determines whether or not the overlay image of the page is changed in accordance with the received information indicating whether or not the overlay image is changed.

If the overlay image is changed, the image forming apparatus 200 renders a new overlay image in a memory. If the overlay image is not changed, the image forming apparatus 200 does not perform this rendering. As described above, an added blank page includes a signal for suppressing formation of an overlay image. The image forming apparatus 200 recognizes this suppression signal and does not form an overlay image on blank pages.

Figure 12A:
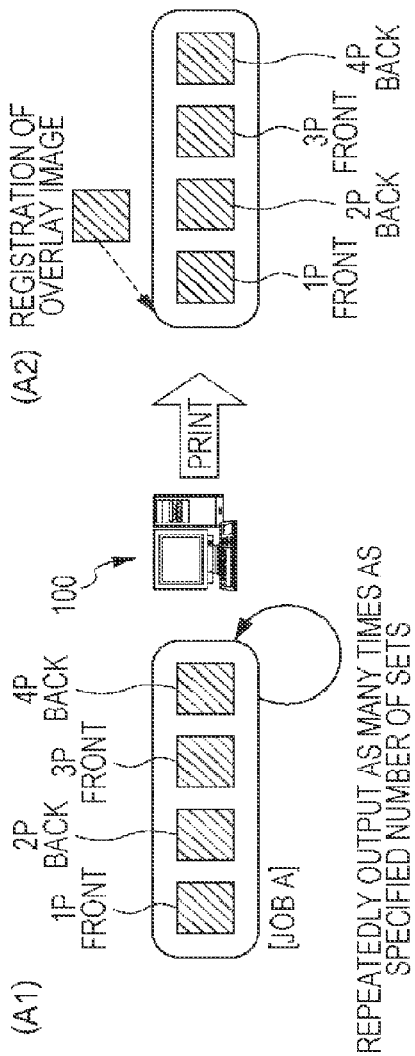
FIGS. 12A and 12B illustrate how overlay images are registered.

This will be specifically described with reference to FIGS. 12A and 12B (which illustrate how overlay images are registered). In the case where the same overlay image (hereinafter, referred to as an "overlay image A") is formed on individual pages as illustrated in (A1) of FIG. 12A, the image forming apparatus 200 first registers the overlay image A as illustrated in (A2) of FIG. 12A. Because the overlay image is not changed thereafter in this example, the registered overlay image A is maintained and this overlay image A is formed on page 2 and following pages.

Figure 12B:
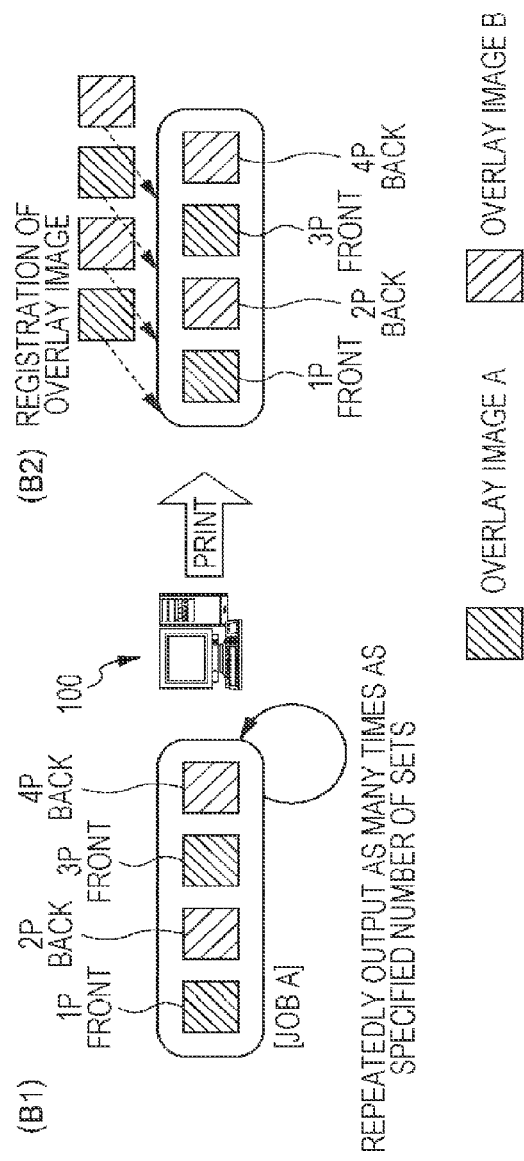

On the other hand, in the case where the overlay image to be formed is changed for the front side and for the back side as illustrated in (B1) of FIG. 12B, the image forming apparatus 200 first registers the overlay image A as illustrated in (B2) of FIG. 12B. The overlay image is then changed in this example, and thus an overlay image B is registered. Thereafter, the overlay images A and B are alternately registered.

During the process described above, an overlay image is always registered at the start of each job. That is, in the case where multiple sets are printed for a single job, an overlay image is registered at the starts of individual jobs for the multiple sets. When, for example, an amount of data of an overlay image is large, registration of the overlay image requires some time. This may undesirably cause a sudden pause in the image forming apparatus 200 when a job is switched to another job. Such a sudden pause of the image forming apparatus 200 would possibly shorten the life of the image forming apparatus 200.

Figure 13:
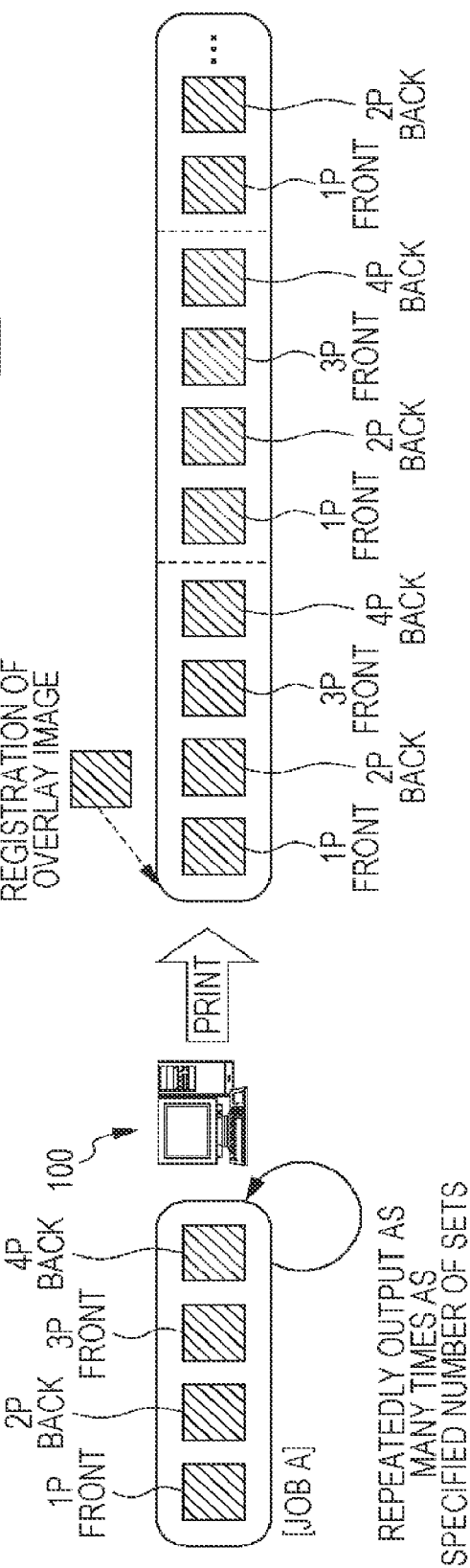
FIG. 13 illustrates how overlay images are registered.

Accordingly, in the present exemplary embodiment, in the case where multiple sets are printed for a single job, the jobs for the multiple sets are integrated into one job and an overlay image is registered at the start of print data resulting from the integration as illustrated in FIG. 13 (which illustrates how overlay images are registered). In this case, an overlay image registration process is not performed until processing of the last page of the last "set" has been finished if the overlay image is not changed. As a result, pausing of the image forming apparatus 200 is less likely to occur.

In the overlay image registration process, for page 2 and following pages, information about an overlay image formed on a page immediately preceding a page subjected to determination is held. The print manager 110 compares the held information of the overlay image with information of an overlay image to be formed on the subject page so as to determine whether or not the "overlay image" is changed to another one. The print manager 110 also transmits, to the image forming apparatus 200, information indicating whether or not the overlay image is changed. The image forming apparatus 200 registers another overlay image upon receiving information indicating that the overlay image is changed.

In the case where print jobs for multiple "sets" are integrated into one print job as described above, a determination as to whether an overlay image formed on the last page of a preceding "set" differs from an overlay image formed on the first page of a following "set" needs to be performed. However, the process described above assumes comparison of an overlay image of a preceding page with an overlay image of a following page within one print job. Accordingly, information about the overlay image of the last page of each "set" is not held because there is no page following this page.

As a result, in the case where print jobs for multiple "sets" are integrated into one print job, information about an overlay image formed on the last page of a preceding "set" is not held. Because of this, the print manager 110 is unable to determine whether or not the overlay image to be formed on the first page of a "set" that follows this preceding "set" is changed. To cope with this situation, the following process is performed in the present exemplary embodiment so as to allow the print manager 110 to determine the overlay image of the first page of each following "set" is changed.

FIGS. 14 to 17 illustrate processes performed by the print manager 110 in relation to the overlay image registration process.

Figure 14:
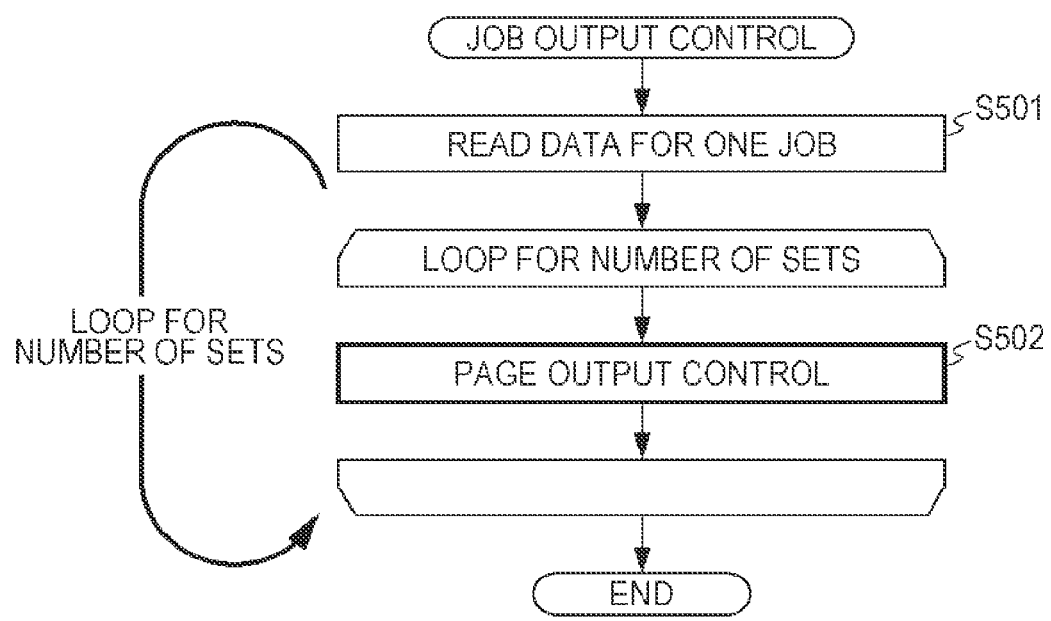
FIG. 14 illustrates a process performed by the print manager in relation to an overlay image registration process.

As illustrated in FIG. 14, prior to the overlay image registration process, the print manager 110 first acquires print data for one job that is transmitted from the host server 300 (step S501), as in FIG. 8. Thereafter, the print manager 110 sequentially outputs pieces of print data of individual pages contained in the print data to the accumulator 120. The print manager 110 performs this output as many times as the number of sets specified by the user (step S502).

Figure 15:
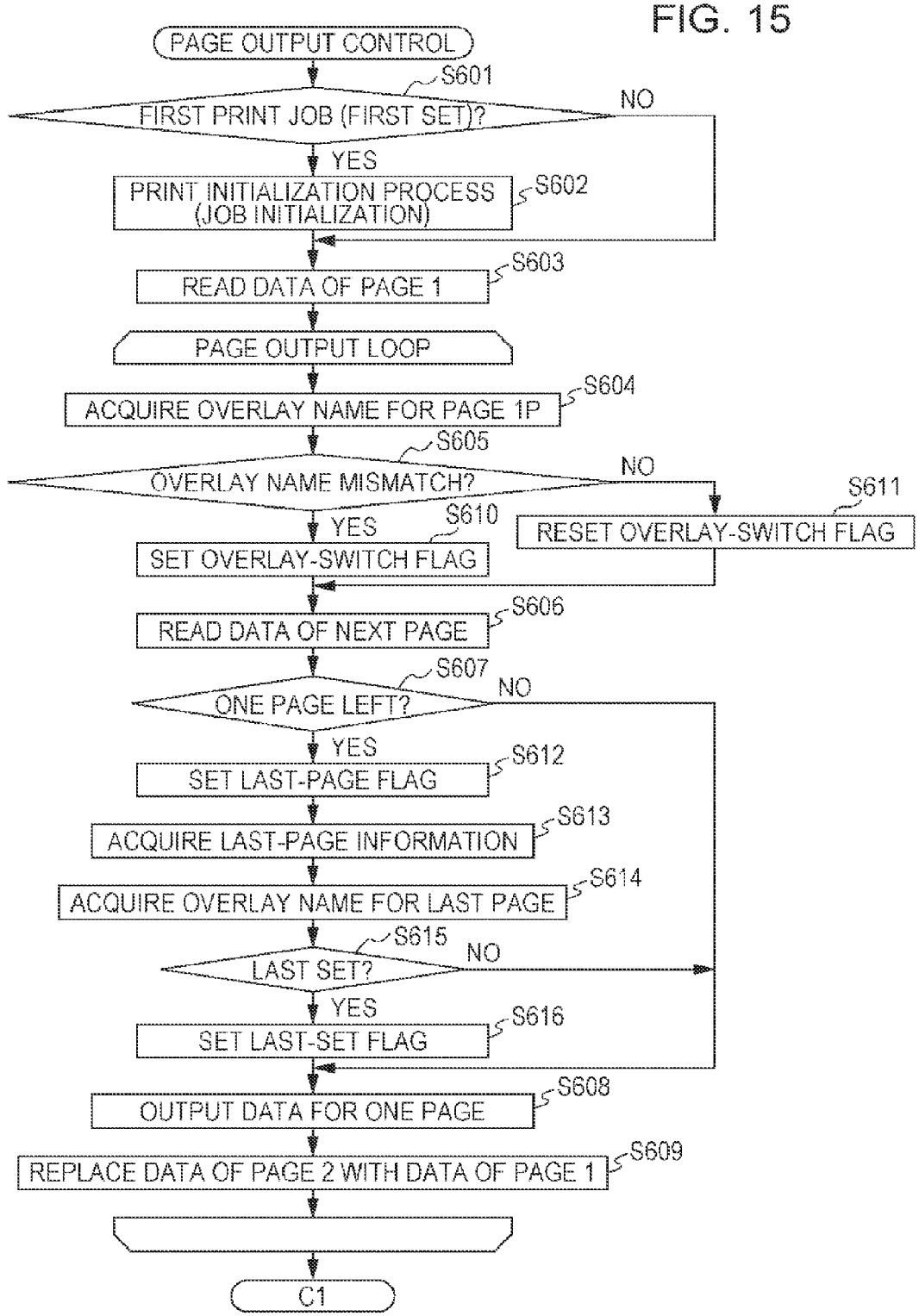
FIG. 15 illustrates a process performed by the print manager in relation to an overlay image registration process.

Referring now to FIG. 15, a process of step S502 will be described in detail. In the process of step S502, the print manager 110 first determines whether or not a current job being processed is a print job for the first "set" (first print job) (step S601), as in the process described in FIG. 9. If it is determined in step S601 that the current job is a print job for the first "set", the print manager 110 performs a print initialization process (job initialization process) (step S602). If it is determined in step S601 that the current job is not a print job for the first "set", the print manager 110 skips this print initialization process.

Then, the print manager 110 reads data of page 1 (step S603) and acquires an overlay name, which is the name of an overlay image to be formed on page 1 (step S604). The print manager 110 then compares the overlay name acquired in step S604 with the held overlay name (the overlay name for the previous page) (step S605). Note that processing of step S605 is not performed for the overlay name for the first page of the first "set" because there is no overlay name for the previous page, and processing of step S606 (reading of data of page 2) is performed.

After performing processing of step S606 (reading of data of page 2), the print manager 110 determines whether or not the number of remaining pages to be processed is one (whether or not the current page is the last page) (step S607) in the present exemplary embodiment. If it is determined that the current page is not the last page, the print manager 110 outputs print data of the current page to the accumulator 120 (step S608). Thereafter, the print manager 110 replaces the data read in step S606 with the data of page 1 (step S609), and performs processing starting from step S604 again. In the processing of step S604 (processing for page 2 or each following page), the overlay name is acquired again.

The print manager 110 compares the overlay name acquired in step S604 (the overlay name for each of page 2 and following pages) with the overlay name for the previous page to determine whether or not the overlay names match (step S605). If it is determined in step S605 that the overlay names do not match, the print manager 110 sets an overlay-switch flag which indicates that the overlay image is changed (step S610). If it is determined in step S605 that the overlay names match, the print manager 110 resets the overlay-switch flag (step S611). Subsequently, the print manager 110 reads print data of the next page (step S606).

Then, in step S607, the print manager 110 again determines whether or not the number of remaining pages to be processed is one (whether or not the current page is the last page). If it is determined that one page is left, the print manager 110 sets the last-page flag which indicates that the current page is the last page (step S612). Subsequently, the print manager 110 acquires last-page information which is information about the last page (step S613). Thereafter, the print manager 110 acquires the overlay name of an overlay image to be formed on this last page (step S614). Then, the print manager 110 determines whether or not the current "set" is the final "set" (last set) (step S615). If the current "set" is the last set, the print manager 110 sets the last-set flag which indicates the current set is the last set (step S616) and performs processing of step S608. If the current set is not the last set, the print manager 110 performs the processing of step S608 without setting the last-set flag.

In the processing of step S608, the print manager 110 sequentially outputs pieces of print data of individual pages. At this time, the print manager 110 refers to the overlay-switch flag. If the overlay-switch flag has not been set, the print manager 110 outputs an image of one page and a signal (information) indicating that the overlay image is not changed. If the overlay-switch flag is set, the print manager 110 outputs an image of one page and a signal (information) indicating that the overlay image is changed.

In this case, upon receiving a signal indicating that the overlay image is changed from the print controller 130 which functions as a transmitting unit, the image forming apparatus 200 changes the overlay image. Specifically, the image forming apparatus 200 registers another overlay image as described above. In contrast, upon receiving a signal indicating that the overlay image is not changed, the image forming apparatus 200 does not register another overlay image but forms an overlay image that has already been registered.

In the present exemplary embodiment, the print manager 110 which functions as a holding unit acquires and holds the overlay name of an overlay image to be printed on the last page of a given "set" in step S614. Thereafter, the print manager 110 which also functions as a grasping unit grasps the overlay name of an overlay image to be formed on page 1 (first page) of a "set" following this given "set". Then, in step S605, the acquired (held) overlay name (the overlay name for the preceding "set") is compared with the grasped overlay name (the overlay name for the following "set"). In this way, an inconvenience that the print manager 110 is unable to determine whether or not to change the overlay image of the first page of a "set" following a preceding "set" is avoided in the present exemplary embodiment.

Figure 16:
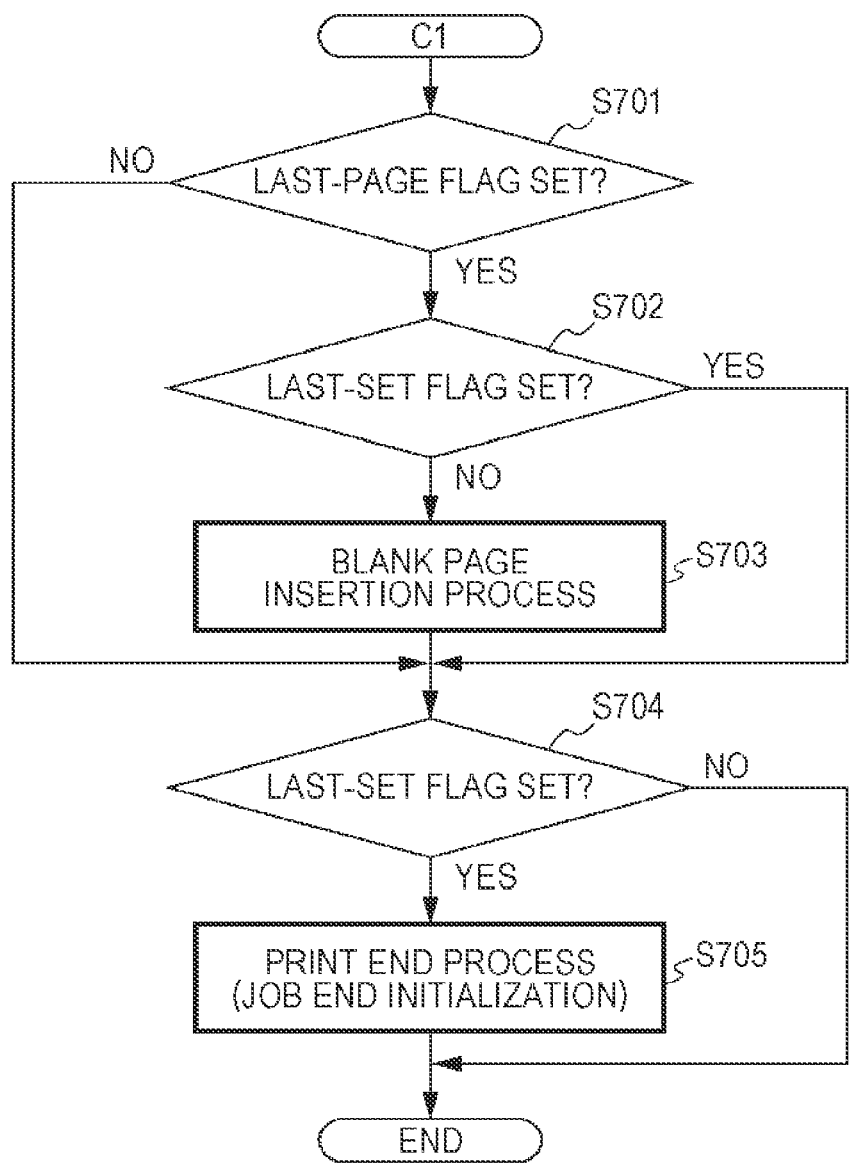
FIG. 16 illustrates a process performed by the print manager in relation to an overlay image registration process.

After finishing the processing of steps S601 to S616 (a series of processing steps illustrated in FIG. 15) for each "set" of the multiple sets, the print manager 110 performs a process illustrated in FIG. 16. The process illustrated in FIG. 16 is similar to that described in FIG. 10, and thus is briefly described. The print manager 110 first determines whether or not the last-page flag has been set (step S701). If the last-page flag has been set, the print manager 110 determines whether or not the last-set flag has been set (step S702).

If the last-set flag has not been set, the print manager 110 performs a blank page insertion process (step S703). When the last-page flag has been set but the last-set flag has not been set, an image of the first page of a following "set" is printed in the blank area of a preceding "set" as described above, and thus the blank page insertion process is performed. When the last-page flag and the last-set flag have been set, the print manager 110 skips the blank page insertion process.

Thereafter, in the present exemplary embodiment, the print manager 110 determines whether or not the last-set flag has been set (step S704). If the last-set flag has been set, the print manager 110 performs a print end process (job end initialization process) (step S705) and terminates the process. If it is determined in step S704 that the last-set flag has not been set, the print manager 110 performs processing starting from step S603 of FIG. 15 again.

Figure 17:
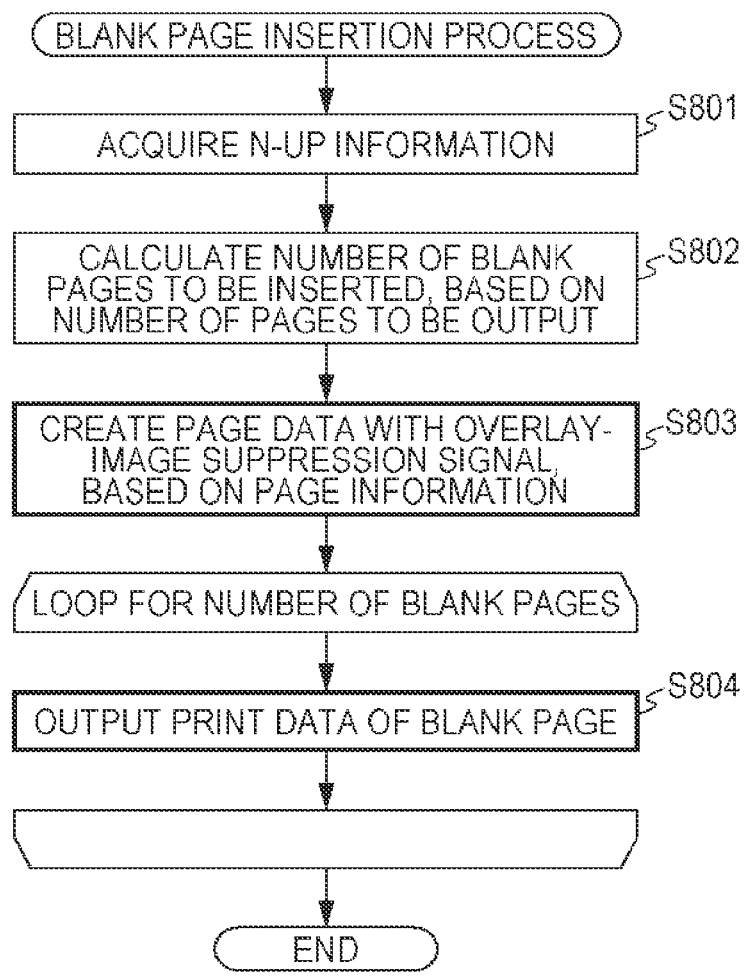
FIG. 17 illustrates a process performed by the print manager in relation to an overlay image registration process.

Referring next to FIG. 17, the blank page insertion process of step S703 will be described in detail. This process is similar to that described in FIG. 11. The print manager 110 first acquires N-up information (step S801). In other words, the print manager 110 acquires information about the number of page images (the number of pages) to be collectively printed within one page.

Then, in accordance with the N-up information acquired in step S801 and the number of pages per set of print data, the print manager 110 calculates the number of blank pages to be inserted (step S802). Subsequently, the print manager 110 generates print data of a blank page, which includes a signal (information) for suppressing formation of an overlay image (step S803). Then, the print manager 110 outputs the print data of a blank page generated in step S803 to the accumulator 120 as many times as the value calculated in step S802 (step S804).

Although not described above, information about a progress state of printing is output from the print controller 130 (see FIG. 2) to the display information generator 150, and consequently the progress state is displayed on the monitor 140 in the present exemplary embodiment. For example, the number of output sets and the number of output pages are displayed on the monitor 140 as illustrated in FIG. 18 (which illustrates an example of information displayed on the monitor 140).

In the present exemplary embodiment, multiple print jobs are integrated into one print job as described above. In this case, the display information generator 150 which functions an already-finished information grasping unit divides the total number of output pages (the number of pages for which printing has been finished by the image forming apparatus 200) by the number of pages per set (unit print data) to determine the quotient of this division. The display information generator 150 uses this quotient as the number of output sets. The display information generator 150 also uses the remainder of this division as the number of output pages (the number of pages that have been printed for a "set" that is being printed immediately after the already-printed "set").

By the way, a failure involving a printing pause may occur in the image forming apparatus 200. In such a case, inaccurate information may be displayed on the monitor 140 after recovery from the failure. Specifically, after recovery from the failure, for example, printing is sometimes restarted by the user from a page immediately following a page for which printing has been completed at the time of occurrence of the failure. In this case, inaccurate information may be displayed on the monitor 140.

For example, a failure may occur when printing of page 4 of the first set has been completed as illustrated in FIG. 19A (which illustrates a printing state of the image forming apparatus 200). Thereafter, page 5 is specified as a printing start page and printing is restarted as illustrated in FIG. 19B. In this case, the print controller 130 recognizes page 5 as the first page, and consequently information displayed on the monitor 140 becomes inaccurate. Specifically, the total number of pages to be printed reduces from the value recognized before occurrence of the failure, and consequently information displayed on the monitor 140 becomes inaccurate.

More specifically, in the present exemplary embodiment, the number of output sets and the number of output pages are grasped by dividing the total number of output pages by the number of pages per set as described above. Because a page from which printing is restarted after recovery from a failure is recognized as the first page, the total number of output pages reduces after recovery of the failure. If the above division is performed in this state, the number of output sets and the number of output pages are no longer grasped accurately. In this case, information as illustrated in FIG. 20 (which illustrates an example of information displayed on the monitor 140) is displayed.

In order to suppress occurrence of such an inconvenience, the number of pages that have been printed at the time of occurrence of a failure is held, the held number of pages is added to the number of pages printed after recovery from the failure, and the resulting value is used as the total number of output pages in the present exemplary embodiment, as illustrated in FIGS. 21A and 21B (which illustrate information, such as the number of printed pages).

Specifically, when the image forming apparatus 200 stops operating due to a failure, the display information generator 150, which is an example of a number-of-completed-pages grasping unit, grasps and holds the number of pages that have been printed at the time of occurrence of the failure (the number of completed pages) in the present exemplary embodiment. After the image forming apparatus 200 recovers, the held number of completed pages is added to the number of pages printed after the recovery, and the resulting value is used as the total number of output pages. This allows accurate information to be displayed after recovery from a failure as illustrated in FIG. 22 (which illustrates an example of information displayed on the monitor 140).

Note that in the case where blank pages have been inserted and printed at the time of occurrence of the failure, a value including the number of printed blank pages is held as the held number of printed pages (the number of completed pages). Also, in the case where blank pages are printed after recovery from the failure, the number of printed blank pages is also counted and included in the number of printed pages (the number of completed pages for which printing has been finished).

Furthermore, in the present exemplary embodiment, the number of printed pages is divided by the number of pages per set (unit print data) as described above. In the case where blank pages are inserted, the number of inserted blank pages is added to the number of pages per set (unit print data) and the resulting value is used as the new number of pages per set (unit print data). For example, in the case where four page images are collectively printed within one page and the number of pages per set is 9, three blank pages are added. In this case, 12 which is obtained by adding 3 which represents three blank pages, to 9 which represents the original number of pages per set is used as the new number of pages per set (unit print data).

Figure 23:
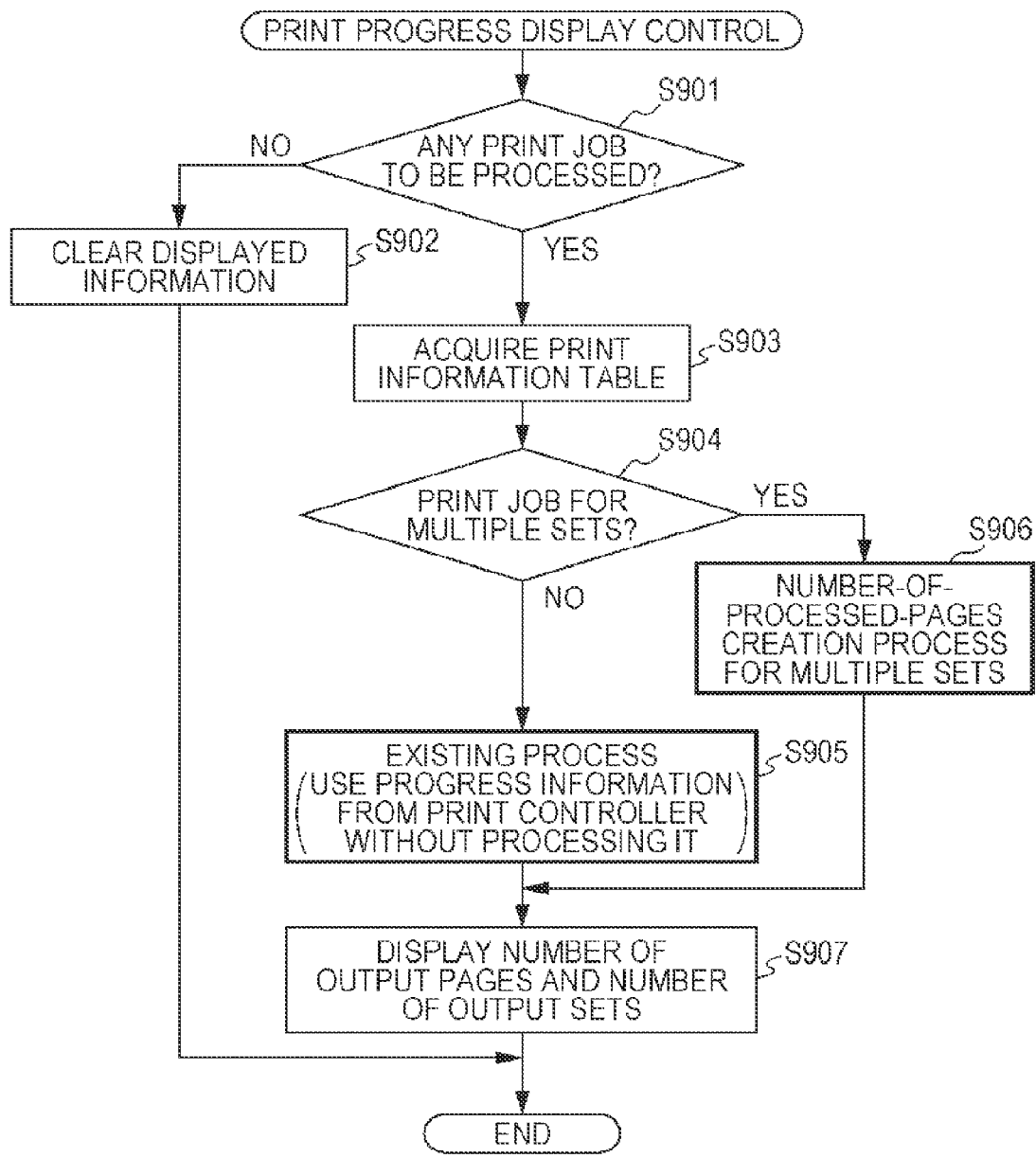
FIG. 23 illustrates a process performed by the print server.

FIG. 23 illustrates a display control process performed by the print server 100.

During the display control process, the print manager 110 first determines whether or not there is a print job to be processed (step S901). If it is determined that there is no print job, the monitor controller 160 clears information displayed on the monitor 140 (step S902). If it is determined in step S901 that there is a print job, the display information generator 150 acquires, from the print manager 110, a print information table which contains the print start page number, the print end page number, the number of sets to be printed, the N-up information (the number of page images to be collectively printed within one page), on/off of double-sided printing, and so forth (step S903).

Subsequently, the display information generator 150 determines whether or not multiple sets are printed (step S904). If multiple sets are not printed, the display information generator 150 uses progress information received from the print controller 130 without processing it, and generates display information, which is used to display information on the monitor 140 (step S905). Specifically, in this case, multiple print jobs are not integrated, and thus display information is generated without dividing the total number of output pages by the number of pages per set.

If it is determined in step S904 that multiple sets are printed, the display information generator 150 performs a display information correction process (number-of-processed-pages creation process for multiple sets) (step S906) so as to generate information related to the number of printed sets and the number of printed pages. The information generated by the display information generator 150 is then displayed on the monitor 140 (step S907).

Figure 24:
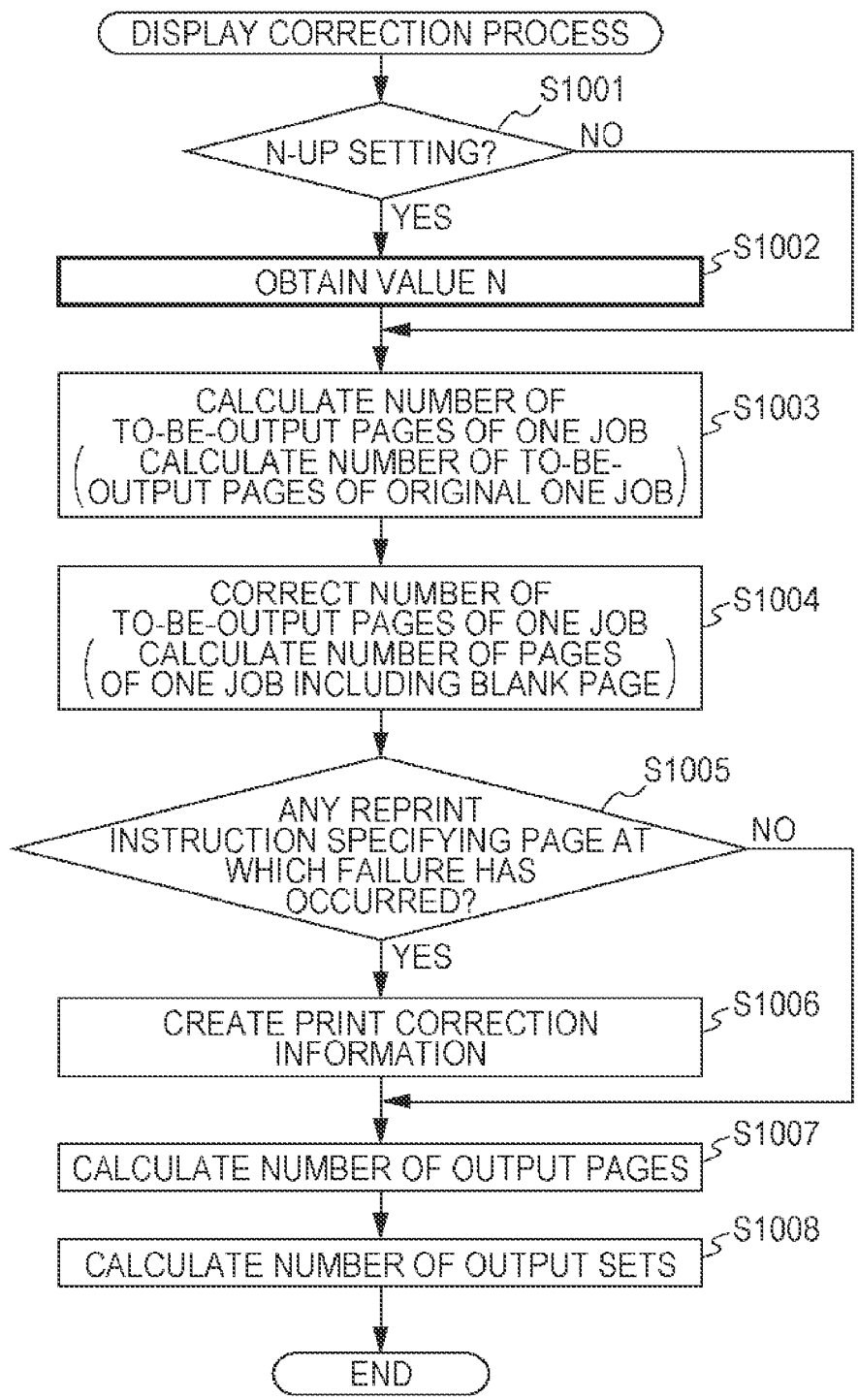
FIG. 24 is a flowchart illustrating a flow of a display information correction process.

Referring now to FIG. 24 (which is a flowchart illustrating a flow of the display information correction process), the process performed in step S906 will be described in detail.

The display information generator 150 first determines whether or not an N-up setting is specified (N page images are collectively printed within one page) (step S1001). If the N-up setting is specified, the display information generator 150 grasps the number of page images per page (the number of page images collectively printed within one page) (step S1002). If the N-up setting is not specified, the processing of step S1002 is skipped and processing of step S1003 is performed.

In step S1003, the display information generator 150 calculates the number of pages per job. Specifically, the display information generator 150 uses an equation "the number of to-be-output pages per job=the print end page number−(the print start page number−1)" to grasp the number of pages per job. At this time, the number of pages is grasped without adding the number of inserted blank pages. Subsequently, if the N-up setting is specified, the display information generator 150 corrects the number of to-be-output pages (step S1004). Specifically, the number of inserted blank pages is also included in one job and the number of pages of this one job is grasped.

Specifically, the display information generator 150 uses an expression

[{the quotient of (the number of pages per job/the number of page images)+1}×the number of page images]

to grasp the number of pages including blank pages.

In the case of double-sided printing, the number of pages is grasped using the number of page images which is equal to 2.

If a failure occurs during printing, the display information generator 150 determines whether or not a printing restart instruction is given by the user (step S1005). If a printing restart instruction is given, the display information generator 150 creates a correction value (step S1006). Specifically, the display information generator 150 grasps the number of pages that have been printed at the time of occurrence of the failure. More specifically, in the present exemplary embodiment, the number of pages that have been printed at the time of occurrence of a failure is held and this held number of printed pages is grasped. Although a configuration of holding the number of printed pages has been described above, the number of pages that have been printed at the time of occurrence of a failure may be grasped using Expression below.

"(the page number from which printing is restarted)−(the original print start page number)"

Subsequently, the display information generator 150 calculates the number of output pages (step S1007).

Specifically, the display information generator 150 uses Expression below to calculate the number of output pages.

"The remainder of {(the number of pages printed after restart+the correction value (the number of pages having been printed at the time of occurrence of a failure))/the number of pages per job}"

If blank pages are printed after printing is restarted, the "number of pages printed after restart" includes the number of printed blank pages. Also, if blank pages have been printed at the time of occurrence of a failure, the "correction value" includes the number of printed blank pages. Moreover, if blank pages are inserted, the "number of pages per job" includes the number of inserted blank pages.

Subsequently, the display information generator 150 calculates the number of output sets (step S1008).

Specifically, the display information generator 150 uses Expression below to calculate the number of output sets.

> "The quotient of {(the number of pages printed after restart+the correction value (the number of pages having been printed at the time of occurrence of a failure))/the number of pages per job}"

Similarly to the above case, if blank pages are printed after printing is restarted, the "number of pages printed after restart" includes the number of printed blank pages. Also, if blank pages have been printed at the time of occurrence of a failure, the "correction value" includes the number of printed blank pages. Moreover, if blank pages are inserted, the "number of pages per job" includes the number of inserted blank pages.

Thereafter, in the present exemplary embodiment, a display process is performed in step S907 (see FIG. 23), and consequently the number of output pages and the number of output sets are displayed on the monitor 140.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device comprising:
   an output unit that acquires print data for one job, and outputs a plurality of pieces of page data of individual pages including, for each individual page, an overlay-switch flag that is set based on a comparison of an overlay name of an overlay image to be added to the individual page with an overlay name of an overlay image to be added to a previous individual page to the individual page;
   a holding unit that, in a case in which the print data is to be output as a plurality of sets of the pieces of page data, holds a first overlay name of an overlay image that is to be added to a last page of a given set of the plurality of sets;
   a grasping unit that, in the case in which the print data is to be output as the plurality of sets, grasps a second overlay name of an overlay image that is to be added to a first page of a next set following the given set; and
   a transmitting unit that compares the first overlay name with the second overlay name, and that transmits information indicating whether or not a registered overlay image is to be changed for the next set based on the comparison, to the printing mechanism.

2. The print control device according to claim 1, wherein the transmitting unit compares the first overlay name with the second overlay name and determines if there is a mismatch, and transmits the information based on the determination.

3. The print control device according to claim 1, wherein the overlay images are images to be overlayed over the page data.

4. The print control device according to claim 3, wherein each of the overlay images is a background image or a header.

5. The image forming apparatus according to claim 1, wherein the overlay images are additional images that are additionally printed on each page.

6. The image forming apparatus according to claim 5, wherein the overlay images are background images or headers.

7. The image forming apparatus according to claim 1, wherein the generated print data is changed based on the transmitted information.

8. An image forming apparatus comprising:
   an image forming mechanism that forms an image on a medium; and
   a print control device that controls printing performed by the image forming mechanism, wherein
   the print control device includes the print control device according to claim 1.

9. The image forming apparatus according to claim 8, wherein the transmitting unit compares the first overlay name with the second overlay name and determines if there is a mismatch, and transmits the information based on the determination.

10. The image forming apparatus according to claim 8, wherein the overlay images are images to be overlayed over the page data.

11. The image forming apparatus according to claim 10, wherein each of the overlay images is a background image or a header.

12. A non-transitory computer readable medium storing a program causing a computer to execute a process, the process comprising:
    acquiring print data for one job, and outputting a plurality of pieces of page data of individual pages including, for each individual page, an overlay-switch flag that is set based on a comparison of an overlay name of an overlay image to be added to the individual page with an overlay name of an overlay image to be added to a previous individual page to the individual page;
    holding, in a case in which the print data is to be output as a plurality of sets of the pieces of page data, holds a first overlay name of an overlay image that is to be added to a last page of a given set of the plurality of sets;
    grasping, in the case in which the print data is to be output as the plurality of sets, a second overlay name of an overlay image that is to be added to a first page of a next set following the given set; and
    comparing the first overlay name with the second overlay name, and transmitting information indicating whether or not a registered overlay image is to be changed for the next set based on the comparison, to the printing mechanism.

13. The computer readable medium according to claim 12, wherein the process compares the first overlay name with the second overlay name and determines if there is a mismatch, and transmits the information based on the determination.

14. The computer readable medium according to claim 12, wherein the overlay images are images to be overlayed over the page data.

15. The computer readable medium according to claim 14, wherein each of the overlay images is a background image or a header.

16. The computer readable medium according to claim 12, wherein the generated print data is changed based on the transmitted information.

* * * * *